UNITED STATES PATENT OFFICE.

THOMAS B. ALLEN, OF TORONTO, ONTARIO, CANADA, ASSIGNOR TO GENERAL ABRASIVE COMPANY, INC., OF NIAGARA FALLS, NEW YORK.

MANUFACTURE OF CRYSTALLIZED ABRASIVES.

1,199,042.  Specification of Letters Patent.  Patented Sept. 26, 1916.

No Drawing.  Application filed July 24, 1916.  Serial No. 111,077.

*To all whom it may concern:*

Be it known that I, THOMAS BOLES ALLEN, of the city of Toronto, in the county of York, Province of Ontario, Canada, have invented certain new and useful Improvements in the Manufacture of Crystallized Abrasives, of which the following is a specification.

This invention relates particularly to the production of aluminous abrasives by the fusion of anhydrous or hydrated oxid of aluminum, the fused product being cooled to the solid state, ground and made up by combination with a suitable magma into grinding wheels, or other forms of abrasive tools. The requirements in such abrasive tools are that they may be obtained possessing varying physical properties such as different degrees of hardness and toughness, and that it shall always be possible to exactly duplicate tools of any given physical properties. I have found that the hardness of the tool depends largely on the alumina content, but the toughness or "temper" is largely dependent on the crystallization of the alumina.

I have in United States Patent No. 1,187,225, disclosed a method by which the character of the crystallization may to a certain extent be controlled, namely, by controlling the rate of cooling, the specific means suggested being the varying of the size of the molds employed. I have now discovered as the result of experiment that further control of the crystallization can be obtained by heating the molds or luggies into which the molten material is poured to varying temperatures, as the higher the temperature of the luggie at the time of pouring the slower will be the rate of cooling, other conditions being equal. I have further discovered that the temperature of the molten material at the time of pouring has an unexpected effect on the nature of the crystallization. If, for example, the temperature of the molten material be very high, the resultant product is of a very brittle nature, whereas if the temperature is only slightly above the melting point a very tough product is obtained. These characteristics will, of course, be modified by the rate of cooling. In my preferred process therefore I control both the temperature of the molten product and the rate of cooling, and preferably also heat the luggies into which the material is poured to assist in the control of the cooling and to prevent any sudden chilling of any part of the material poured.

In carrying out my process the bauxite or any other form of alumina which may be employed is fused in an electric furnace provided with a suitable tap hole or tap holes. The temperature is controlled by regulating the height of the electrodes or by regulating the current, or in any other suitable way. Ordinarily the temperature can with sufficient accuracy be so regulated without the use of a pyrometer, though such may be employed if desired. When the necessary temperature of the fused product is reached, it is tapped into luggies, preferably of metal and preferably of such size as to cause the cooling to take place at the desired rate, the size of the luggies being varied to suit the rate of cooling desired. These luggies are previously heated to a greater or lesser degree to control the rate of cooling of the fused product and to prevent chilling of any portions of the fused material poured. By proceeding in the manner described, I am enabled to secure in the final product the physical properties desired as set out in the preamble to this specification.

What I claim as my invention is:—

1. A process of treating aluminous abrasives which consists in fusing alumina in an electric furnace, in controlling the temperature of the molten material according to the crystalline characteristics desired in the resultant product, and subsequently pouring and cooling the molten material.

2. A process of treating aluminous abrasives which consists in fusing alumina in an electric furnace, in controlling the temperature of the molten material according to the crystalline characteristics desired in the resultant product, and subsequently pouring the molten material into pre-heated molds.

3. A process of treating aluminous abrasives which consists in fusing alumina in an electric furnace, in controlling the temperature of the molten material according to the crystalline characteristics desired in the resultant product, and subsequently pouring the molten material and controlling its rate of cooling according to the crystalline characteristics desired in the resultant product.

4. A process of treating aluminous abrasives which consists in fusing alumina in an electric furnace, in controlling the temperature of the molten material according to the crystalline characteristics desired in the resultant product, and subsequently pouring the molten material into pre-heated molds and controlling its rate of cooling according to the crystalline characteristics desired in the resultant product.

5. A process of treating aluminous abrasives which consists in fusing alumina in an electric furnace and pouring the same into pre-heated molds.

6. A process of treating aluminous abrasives which consists in fusing alumina in an electric furnace and pouring the same into pre-heated molds and thereafter controlling its rate of cooling according to the crystalline characteristics desired in the resultant product.

7. A process of treating aluminous abrasives which consists in fusing alumina in an electric furnace and pouring the same into molds and thereafter controlling its rate of cooling according to the crystalline characteristics desired in the resultant product.

Signed at Niagara Falls, N. Y. this 18th day of July 1916.

THOMAS B. ALLEN.

Witnesses:
P. E. HAMBLY,
MAUDE B. HAMBLY.